United States Patent
Kang et al.

(10) Patent No.: US 12,184,527 B2
(45) Date of Patent: Dec. 31, 2024

(54) HEALTH INDEX OF A SERVICE

(71) Applicant: Microsoft Technology Licensing, LLC, Redmond, WA (US)

(72) Inventors: Yu Kang, Redmond, WA (US); Rulei Yu, Redmond, WA (US); Bo Qiao, Redmond, WA (US); Pu Zhao, Redmond, WA (US); Qingwei Lin, Beijing (CN); Jian Sun, Redmond, WA (US); Li Yang, Redmond, WA (US); Xiaofeng Gao, Redmond, WA (US); Pochian Lee, Redmond, WA (US); Dongmei Zhang, Beijing (CN); Zhangwei Xu, Redmond, WA (US); Liqun Li, Beijing (CN); Xu Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/927,679

(22) PCT Filed: Jun. 30, 2020

(86) PCT No.: PCT/CN2020/099344
§ 371 (c)(1),
(2) Date: Nov. 23, 2022

(87) PCT Pub. No.: WO2022/000285
PCT Pub. Date: Jan. 6, 2022

(65) Prior Publication Data
US 2023/0179501 A1    Jun. 8, 2023

(51) Int. Cl.
*H04L 43/10* (2022.01)
*G06F 11/07* (2006.01)
(Continued)

(52) U.S. Cl.
CPC .................................. *H04L 43/10* (2013.01)

(58) Field of Classification Search
CPC ..... H04L 43/10; H04L 43/06; H04L 43/0823; H04L 43/16; H04L 41/16;
(Continued)

(56) References Cited

U.S. PATENT DOCUMENTS 8,271,615 B2    9/2012    Ellison et al.
8,996,397 B2    3/2015    Grace et al.
(Continued)

FOREIGN PATENT DOCUMENTS

CN    102122374 A    7/2011
CN    102449567 A    5/2012
(Continued)

OTHER PUBLICATIONS

"68-95-99.7 Rule", Retrieved From: https://en.wikipedia.org/wiki/68%E2%80%9395%E2%80%9399.7_rule, Feb. 19, 2020, 5 Pages.
(Continued)

*Primary Examiner* — Kamal M Hossain
(74) *Attorney, Agent, or Firm* — Schwegman Lundberg & Woessner, P.A.

(57) ABSTRACT

According to implementations of the subject matter described herein, there is provided a solution of providing a health index of a service. In this solution, a plurality of incident information sets associated with a plurality of services are obtained. The plurality of services are provisioned in a computing environment. An incident information set indicates at least one incident reported during operation of a service. Respective health indices are determined for the plurality of services based on respective ones of the plurality of incident information sets and a health classification policy. The respective health indices indicate respective health statuses of the plurality of services and being deter-
(Continued)

mined from a same health index range. Through unified use of incident information, the determined health indices can indicate universal and consistent health statuses for different services.

20 Claims, 6 Drawing Sheets

(51) Int. Cl.

| | | |
|---|---|---|
| G06F 11/30 | (2006.01) | |
| G06F 11/32 | (2006.01) | |
| G06F 11/34 | (2006.01) | |
| H04L 41/0894 | (2022.01) | |
| H04L 41/22 | (2022.01) | |
| H04L 41/50 | (2022.01) | |
| H04L 41/5009 | (2022.01) | |
| H04L 41/507 | (2022.01) | |
| H04L 43/045 | (2022.01) | |
| H04L 43/16 | (2022.01) | |

(58) Field of Classification Search
CPC ........... G06F 2201/865; G06F 11/3006; G06F 11/0781; G06F 2201/81; G06F 11/345
See application file for complete search history.

(56) References Cited

U.S. PATENT DOCUMENTS

| | | | |
|---|---|---|---|
| 9,674,211 B2 | 6/2017 | Curcic et al. | |
| 2013/0198119 A1* | 8/2013 | Eberhardt, III | G06N 20/00 706/12 |
| 2013/0219042 A1 | 8/2013 | Behrendt et al. | |
| 2013/0346163 A1* | 12/2013 | Kemmer | G06Q 10/20 705/7.41 |
| 2016/0103838 A1 | 4/2016 | Sainani | |
| 2016/0132892 A1* | 5/2016 | Zhou | G06Q 30/016 705/304 |
| 2017/0063650 A1* | 3/2017 | Chavali | H04L 41/5074 |
| 2018/0091392 A1* | 3/2018 | Richards | H04L 43/08 |
| 2018/0367940 A1* | 12/2018 | Kwong | H04W 24/08 |
| 2019/0097909 A1 | 3/2019 | Puri | |
| 2019/0227864 A1 | 7/2019 | Jayaraman | |
| 2019/0362716 A1 | 11/2019 | Tran et al. | |
| 2019/0372827 A1 | 12/2019 | Vasseur et al. | |
| 2019/0394080 A1 | 12/2019 | Malboubi et al. | |
| 2020/0112497 A1* | 4/2020 | Yenumulapalli | H04L 43/10 |
| 2021/0406803 A1* | 12/2021 | Krause | G06Q 10/10 |

FOREIGN PATENT DOCUMENTS

| | | |
|---|---|---|
| CN | 103580934 A | 2/2014 |
| CN | 103905549 A | 7/2014 |
| CN | 105453103 A | 3/2016 |

OTHER PUBLICATIONS

"Amazon CloudWatch", Retrieved From: https://aws.amazon.com/cloudwatch/, Mar. 17, 2020, 8 Pages.
"AWS Monitoring Tool", Retrieved From: https://www.site24x7.com/aws-monitoring.html, Retrieved Date: Mar. 25, 2020, 9 Pages.
"Azure Status", Retrieved From: https://status.azure.com/status, Retrieved Date: Mar. 25, 2020, 13 Pages.
"Cloud Monitoring", Retrieved From: https://cloud.google.com/monitoring, Retrieved Date: Mar. 25, 2020, 13 Pages.
"Cloud Monitoring", Retrieved From: https://www.manageengine.com/products/applications_manager/cloud-monitoring.html, Retrieved Date: Mar. 25, 2020, 6 Pages.
"Google Cloud", Retrieved From: https://status.cloud.google.com/, Retrieved Date: Mar. 25, 2020, 2 Pages.
"Incidents for metric-based alerts", Retrieved From: https://cloud.google.com/monitoring/alerts/incidents-events, Retrieved Date: Mar. 25, 2020, 9 Pages.
"Service Health", Retrieved From: https://health.aws.amazon.com/health/status, Retrieved Date: Mar. 25, 2020, 7 Pages.
"Solarwinds", Retrieved From: https://www.solarwinds.com/, Feb. 29, 2020, 10 Pages.
Barberio, et al., "Facebookarchive", Retrieved From: https://github.com/facebookarchive/fbtracert, Jul. 25, 2020, 4 Pages.
Guo, et al., "Pingmesh: A Large-Scale System for Data Center Network Latency Measurement and Analysis", In Proceedings of Proceedings of the 2015 ACM Conference on Special Interest Group on Data Communication, Aug. 17, 2015, pp. 139-152.
"International Search Report and Written Opinion Issued in PCT Application No. PCT/CN20/099344", Mailed Date: Mar. 24, 2021, 9 Pages.
Peng, et al., "Detector: A Topology-Aware Monitoring System For Data Center Networks", In Proceedings of the USENIX Annual Technical Conference, Jul. 12, 2017, pp. 55-68.
Razian, et al., "ARC: Anomaly-Aware Robust Cloud-Integrated Iot Service Composition Based On Uncertainty In Advertised Quality Of Service Values", In the Journal of Systems and Software, vol. 164, Feb. 21, 2020, 20 Pages.
"The Full-Stack Monitoring Platform that lets you deploy AWS Resources with Confidence", Retrieved From: https://web.archive.org/web/20191007204343/https://www.site24x7.com/aws-monitoring.html, Oct. 7, 2019, 7 Pages.
Communication pursuant to Rules 70(2) and 70a(2) Received in European Patent Application No. 20942662.6, mailed on Feb. 9, 2024, 1 page.
Extended European search report received for European Application No. 20942662.6, mailed on Jan. 23, 2024, 9 pages.
First Office Action Received for Chinese Application No. 202080102107.0, mailed on Jul. 24, 2024, 13 pages. (English Translation Provided).

* cited by examiner

HEALTH INDEX OF A SERVICE

CROSS-REFERENCE TO RELATED APPLICATION

This application is a U.S. National Stage Filing under 35 U.S.C. 371 of International Patent Application Serial No. PCT/CN2020/099344, filed Jun. 30, 2020, and published as WO 2022/000285A1 on Jan. 6, 2022, which application and publication are incorporated herein by reference in their entirety.

BACKGROUND

Cloud computing is network-based computing, typically Internet-based computing, where shared resources, software and information are provided on-demand. Service providers can provision many service functionalities in a cloud computing environment for customers to access. The customers always want to avoid degradation or interruption of cloud services. Therefore, the ability to monitor the health of the services provided in the cloud would be extremely helpful.

SUMMARY

According to implementations of the subject matter described herein, there is provided a solution for providing a health index of a service. In this solution, a plurality of incident information sets associated with a plurality of services are obtained. The plurality of services are provisioned in a computing environment. An incident information set associated with a service indicates at least one incident reported during operation of the service. Respective health indices are determined for the plurality of services based on respective ones of the plurality of incident information sets and a health classification policy. The respective health indices indicate respective health statuses of the plurality of services and being determined from a same health index range.

The Summary is to introduce a selection of concepts in a simplified form that are further described below in the Detailed Description. The Summary is not intended to identify key features or essential features of the subject matter described herein, nor is it intended to be used to limit the scope of the subject matter described herein.

BRIEF DESCRIPTION OF THE DRAWINGS

Throughout the drawings, the same or similar reference symbols refer to the same or similar elements.

DETAILED DESCRIPTION OF IMPLEMENTATIONS

Principles of the subject matter described herein will now be described with reference to some example implementations. It is to be understood that these implementations are described only for the purpose of illustration and help those skilled in the art to better understand and thus implement the subject matter described herein, without suggesting any limitations to the scope of the subject matter disclosed herein.

As used herein, the term "includes" and its variants are to be read as open terms that mean "includes, but is not limited to." The term "based on" is to be read as "based at least in part on." The terms "an implementation" and "one implementation" are to be read as "at least one implementation." The term "another implementation" is to be read as "at least one other implementation." The term "first," "second," and the like may refer to different or the same objects. Other definitions, either explicit or implicit, may be included below.

As used herein, a "machine learning model" is an AI model, which may also be referred to as a "learning model", "learning network", "network model", or "model." These terms are used interchangeably hereinafter. A deep learning model is one example machine learning model, examples of which include a "neural network." A parameter set of the machine learning model is determined through a training phrase of the model based on training data. The trained machine learning model maps a received input to a corresponding output using the trained parameter set. Therefore, the training process of a machine learning model may be considered as learning, from the training data, a mapping or association between the input and the output.

Figure 1:
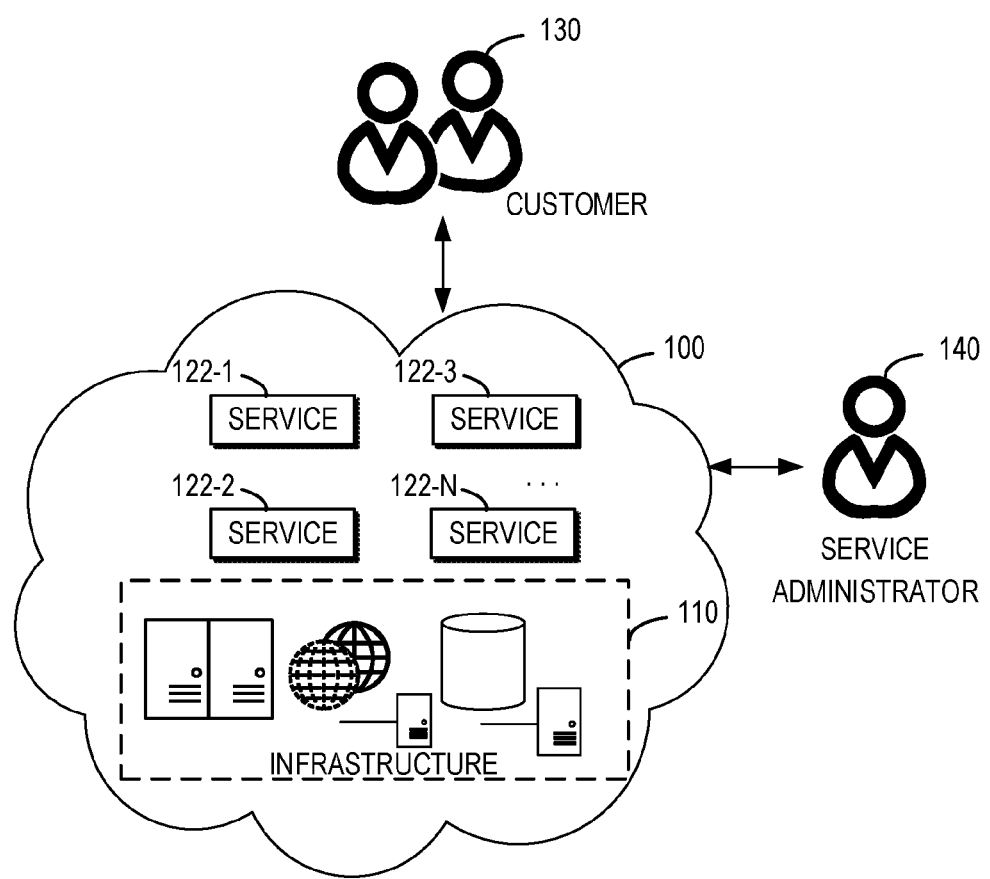
FIG. 1 illustrates a computing environment in which implementations of the subject matter described herein may be employed.

FIG. 1 illustrates a computing environment 100 in which implementations of the subject matter described herein may be employed. The computing environment 100 is illustrated as a cloud computing environment. Infrastructure 110 in the computing environment 100 comprises various hardware or software components to provide a shared pool of physical or virtual resources. The hardware or software components of the infrastructure 110 may be aggregated or distributed at locations of remote data centers.

The resources comprise, for example, networks, network bandwidth, servers, processing devices, memories, storage devices, virtual machines, software, applications, and the like. The resources of the infrastructure 110 can be rapidly provisioned and released with minimal management effort or interaction with a provider.

The computing environment 100 may be built according to a cloud computing model which can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In the subject matter described herein, a "cloud computing environment" is an environment in which cloud computing is employed.

Any number of services can be provisioned over the infrastructure 110 by service providers to their customers 130. The deployment, operation, and user access of the services 122 are supported with the resources of the infrastructure 110. As illustrated, services 122-1, 122-2, 122-3, . . . , 122-N (wherein N is an integer larger than or equal to one) are provisioned in the computing environment 100. For convenience of discussion, the services 122-1, 122-2, 122-3, . . . , 122-N are collectively or individually referred to as services 122.

As used herein, a "service" can be a general term that can refer to any service capable of being executed in or otherwise provisioned by a computing environment to support a corresponding task or function. For example, a service 122 can be any type of web service, identity management service, firewall or other security service, messaging service, data storage or backup service, file maintenance service, or any other service that can be made available to an end user of the computing environment. It should be appreciated that other services associated with or otherwise supported by a computing environment are envisioned.

In operation, failures and errors may occur to some software or hardware components of the infrastructure, resulting in degradation or interruption of provisioning of the services. A service administrator 140 is responsible for maintaining the services 122, diagnosing the failures or errors so as to take necessary acts to fix or mitigate them.

As there may be hundreds to thousands of services provisioned in a computing environment, it is a challenging task to monitor the health of those services. With the explosive growth of cloud computing scale, the provisioned services become more and more complicated. This also provides more challenge for service maintaining because it is difficult to provide a common health monitoring function to all the services.

Currently there are some approaches that focus on monitoring a single service, such as a network service or a storage service. The approaches can hardly be extended to other services as they rely on deep domain knowledge and specific service features. Moreover, by developing specific health monitoring approaches for individual services, there may be a gap between the definition of "healthy" or "unhealthy" across different services. As a result, it is hard to compare the health conditions of different services.

According to implementations of the subject matter described herein, there is proposed a solution for providing universal health indices for services. In this solution, for each service, an incident information set is obtained to determine a health index for the service. The incident information set indicates one or more incidents reported during operation of the service. As incidents are reported for almost most of the services provisioned in a computing environment, for each of a plurality of services, the corresponding incident information set can be obtained for generating a health index for the service. A same health classification policy is adopted to determine the services' health indices from a same health index range based on the incident information sets.

Through unified use of incident information, the determined health indices can indicate universal and consistent health statuses for different services. The definition of healthy or unhealthy across different services is comparable, which means it easier to perform multi-service health tracking during a service management process. For example, it is easier to diagnose which services are health or unhealthy under a same criterion, and/or to predict underlying issues by analyzing change trends of health statues of multiple services.

Example implementations of the subject matter described herein will be discussed in detail below with reference to other figures. It is reiterated that although this disclosure includes a detailed description on cloud computing, implementations of the subject matter described herein are not limited to a cloud computing environment. Rather, the implementations of the subject matter described herein are intended to be implemented with any type of networked computing environment now known or later developed.

Figure 2:
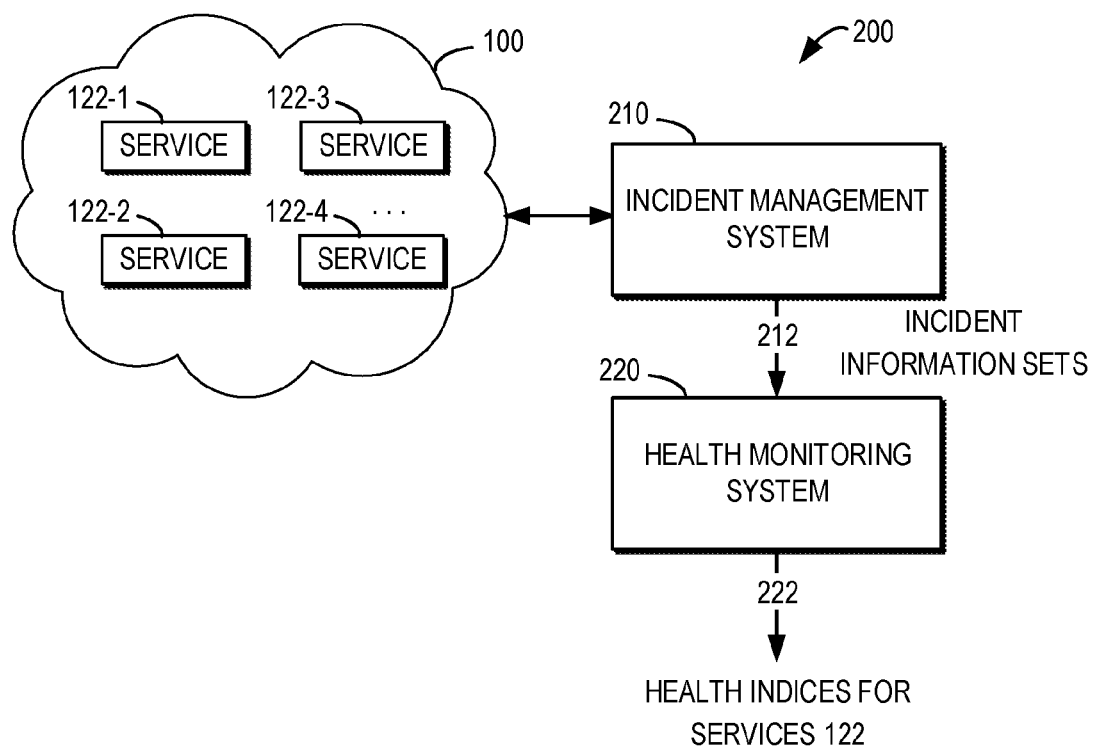
FIG. 2 illustrates a block diagram of example architecture of providing health indices for services in accordance with some implementations of the subject matter described herein.

FIG. 2 illustrates example architecture 200 of providing health indices for services in accordance with some implementations of the subject matter described herein. In the architecture 200, a health monitoring system 220 is configured to generate health indices for a plurality of services 122 to be monitored in the computing environment 100 (the infrastructure therein is omitted here for purpose of brevity). The functions of the health monitoring system 220 described herein may be implemented in the computing environment 100 as one or more services, or may be implemented by one or more computing devices external to the computing environment 100.

In implementations of the subject matter described herein, the health monitoring system 220 obtains incident information associated with the plurality of services 122 to generate the health indices for these services. For each service 122, the health monitoring system 220 obtains an associated incident information set 212 used to determine a health index for this service. The incident information set 212 indicates at least one incident reported during operation of this service 122.

Respective incidents reported for the service may be monitored and collected by an incident management system 210. The functions of the incident management system 210 described herein may also be implemented in the computing environment 100 as one or more services, or may be implemented by one or more computing devices external to the computing environment 100.

As used herein, an incident is an event which is not part of a normal operating process of a service and may impact or interrupt operation of the service and, in some cases, may lead to a disaster. An incident may refer to any event indicating interruption to a service, a reduction in the quality of a service, or an event that has not yet impacted the customers of the service. Depending on the applied terminology and computing environment, such an event may be referred to by other terms instead of "incident." The incident associated with a service may be automatically reported by the service to the incident management system 210. In some implementations, an incident may be triggered by service interruption or degradation complained by a customer.

In addition to the incident, there may be various other types of events associated with a service defined to report the running conditions within the computing environment from different perspectives. Other types of events may include one or more of the following:

Error: an error indicates deviation from the actual and expected value. An error generally made by a manual mistake.

Fault: a fault indicates an incorrect step, process, or data definition in a software program which causes the program to behave in an unintended or unanticipated manner. A fault may be the result of the error.

Failure: a failure indicates inability of a component or a system to perform its required function within specified performance requirements. For example, failures may be reported for a group of physical or virtual resources/components in the computing environment.

Interruption: a stop or break in continuity of a service.

Degradation: a decline in a service level agreement (SLA) of a service, which does not entirely interrupt the service Outage: an outage indicates a period of complete disruption or interruption of operation of a system, infrastructure, the supported service(s), or the whole business operations, which may result in the service providers incapable of providing the service(s) for a period of time. An outage may impacts a large amount of customers.

Among all the possible reported events, an incident may range between a level of degradation of a service to a level of a complete outage. The inventors have found that incidents are preferred and useful for measuring a universal health status of a provisioned service. Some of the reasons are briefly introduced as follows.

On the one hand, as compared with the small failures, errors, or faults, an incident can indicate high-level aggregated information of unhealthy signals of a service. The noises and uncertainties of unhealthy signals concerning the service may be filtered out from the incident. Although the outage can reflect higher-level aggregation of unhealthy signals of a service, a wider-range disaster has been occurred when an outage of a service is reported, which may already require immediate measures. Although there are rarely outages reported, it does not mean that the health status of the service is fully healthy. In view of the above, it is more practical and advantageous to utilize incidents to provide a health index.

On the other hand, triggers for reporting incidents of a service are generally defined by service providers or developers. For example, an incident may be designed to be triggered when monitoring a performance degradation level lower than a degradation threshold, and another incident may be designed to be triggered when the failed storage devices reaches a threshold number. To enable the incident reporting, the measurement approach for calculating performance degradation, the degradation threshold, and the threshold number may be configured by the service provider or developers. Moreover, the designed incidents may implicitly indicate that the performance degradation and the failures of the storage devices can lead to an outage of the service. Therefore, by utilizing the incidents, the domain knowledge and expertise experience can be incorporated in measuring the health status of the service.

Although an incident is a good signal for indicating service health, in a cloud scale, there may be a large number of incidents triggered for a service for a period of time. The incidents may have different severity levels and/or different status, as will be discussed below. It is inappropriate to simply use one of the incidents to indicate the health status of the whole service. According to implementations of the subject matter described herein, in the architecture 200, the health monitoring system 220 measures a health status of a service based on an incident information set 212 associated with a service 122 and maps the incident information set 212 to a health index 222 by following a health classification policy. The health index 222 for each service 122 is selected from a predetermined health index range. For each of the plurality of services 122, the same approach is applied to determine the health index.

A heath index is a quantitative or qualitative indicator to indicate heath of a service, which aims to summarize complex situations reflected in the incident(s) using a single numerical value or other indicator. A health index may also be referred to as a health score, a health metric, or a health level. In some implementations, the health index range may be determined as a numerical range or include a plurality of numerical values, to indicate different levels of health statuses of a service from healthy to unhealthy. A health index 222 may be represented by a numerical value within the numerical range or selected from the plurality of numerical values. For example, a health index may be determined as a value within a range from 0 to 10, where the higher a health index 222 is, the healthier the service 122 is (or vice versa).

In other implementations, a health index 222 may be represented by non-numerical qualitative information. For example, the health index range may include a plurality of qualitative indicators to indicate different health levels. In an example implementation, the health index range may include two indicators to simply indicate either a healthy status or an unhealthy status of a service. It would be appreciated that the health index range and the individual health indices may be represented in other ways and the scope of the subject matter described herein is not limited in this regard.

In some implementations, incidents may be reported in any time point, the health monitoring system 220 may obtain an incident information set 212 indicating incidents of each service 122 during a period of time, for example, several minutes, several hours, or the like. The incidents and the respective times when the incidents are reported may be both included in the incident information set 212. The health monitoring system 220 may use the incident information set 212 to determine a health index 222 to indicate a health status of the service 122 during that period of time.

Figure 3:
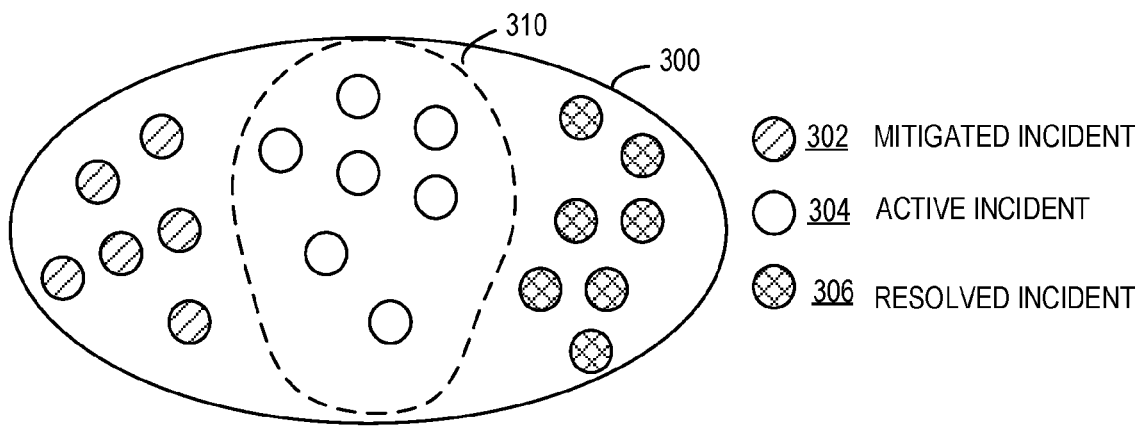
FIG. 3 illustrates an example pool of incidents that are collected for a service in accordance with some implementations of the subject matter described herein.

An incident may be set with one of several predefined statuses. In some implementations, an incident may have one of three statuses including an active status, a mitigated status, and a resolved status. Generally, when an incident is created, its status is marked as active. If the underlying issue related to the incident is mitigated, the status is marked as mitigated. If the issue is totally resolved, the status of the incident may be marked as resolved. FIG. 3 illustrates an example pool 300 of incidents that are collected for a service 122 during a period of time. The incidents include mitigated incidents 302, active incidents 304, and resolved incidents 306.

In some implementations, the incident information set 212 used for measuring the health index 222 of a service may include one or more incidents in the active status. An active incident may reflect an aspect of unhealthy of a service 122. In the example of FIG. 3, among all the incidents reported for the service 122, a subset 310 of active incidents 304 is selected for use. In some other implementations, as the mitigated incidents still indicate existing issues which are mitigated but not totally solved, the incident information set 212 used for measuring the health index 222 may further include one or more incidents in the mitigated status.

In some implementations, the health classification policy used by the health monitoring system 220 defines an approach for classifying a health status of a service 122 into a plurality of health statues indicated by the health index range. There are various approaches that can be adopted perform the health classification based on the incident information sets.

In some implementations, the health classification policy may require extracting one or more types of features from the respective incident information sets 212 associated with the services 122. In some implementations, based on the health classification policy, the health monitoring system 220 may determine the number of (active) incidents over the period of time as a feature of an incident information set 212. More specifically, the health monitoring system 220 may divide the period of time during which the incident information set 212 is collected into a plurality of time intervals, and determine the count of (active) incidents reported during each of the time intervals. The counts of the (active) incidents can form time series data, to indicate the change of the count over time.

In some implementations, when being reported, an incident may be configured with a severity level to indicate how serious this incident is. As an example, five severity levels ranged from 0 to 4 may be defined where a severity level of "0" (represented as "sev0") indicates a critical level, a severity level of "1" (represented as "sev1") indicates a high level, a severity level of "2" (represented as "sev2") indicates a median level, a severity level of "3" (represented as "sev3") indicates a low level, and a severity level of "4" (represented as "sev4") indicates a minor severity level. It would be appreciated that the severity of an incident may be divided into more or less than five levels. In some implementations, the incident information set 212 associated with a service 122 may also indicate respective severity levels of incidents.

As different severity levels may indicate different levels of disruption or degradation of a service, in some implementations, the health monitoring system 220 may extract respective features per severity level from the incident information set 212. More specifically, the health monitoring system 220 may divide the incidents indicated in an incident information set 212 according to their severity levels. The health monitoring system 220 may divide the period of time during which the incident information set 212 is collected into a plurality of time intervals, and determine the count of incidents at each of the severity levels for each of the time intervals. For each severity level of a service 122, the corresponding count of the incidents can form time series data, to indicate the change of the count over time.

Figure 4:
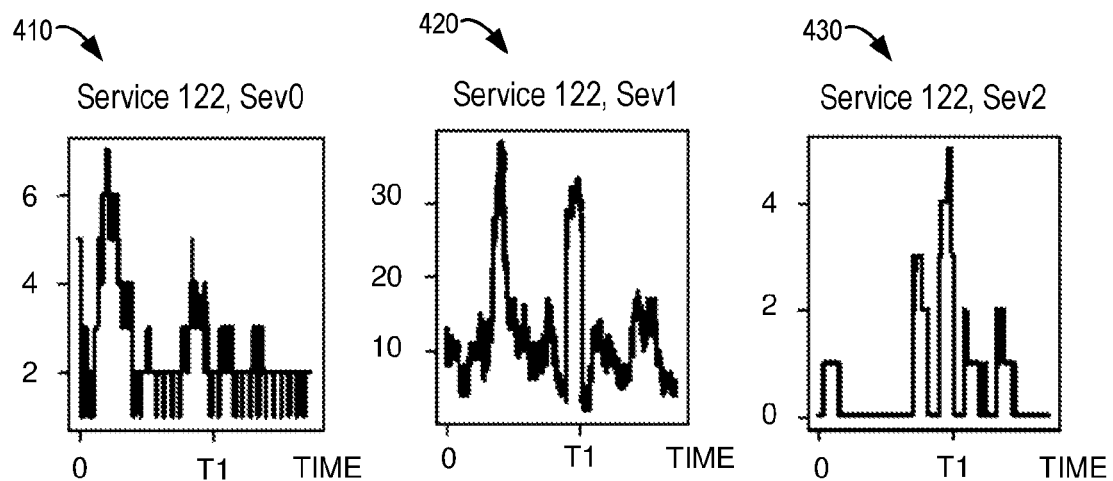
FIG. 4 illustrates graphs indicating the time series data indicating the counts of incidents for a service in accordance with an implementation of the subject matter described herein.
Figure 4:
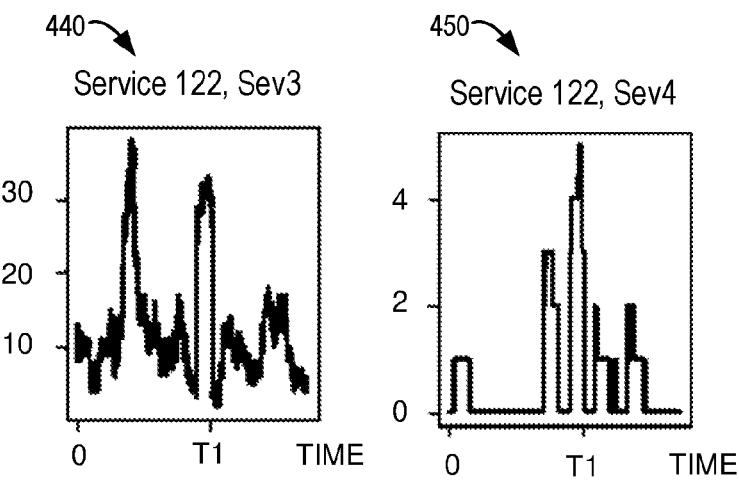

FIG. 4 illustrates graphs indicating the time series data indicating the counts of incidents for a service 122. In FIG. 4, a graph 410 indicates the count of incidents at the severity level of "0" changed over time. Similarly, a graph 420 indicates the change of the count of incidents at the severity level of "1," a graph 430 indicates the change of the count of incidents at the severity level of "2," a graph 440 indicates the change of the count of incidents at the severity level of "3," a graph 450 indicates the change of the count of incidents at the severity level of "4." It would be appreciated that the example of FIG. 4 is provided merely for the purpose of illustration without suggesting any limitation.

With the extracted feature, the health classification policy used by the health monitoring system 220 may further define an algorithm to determine a health index 222 for a service 122 based on the extracted feature. In some implementations, the health monitoring system 220 may apply an anomaly detection algorithm to detect anomaly in the extracted feature, for example, the time series data regarding the counts of incidents. For example, as the counts of incidents at different severity levels change over time, there may be some peaks for time series data, as can be seen from the graphs 410-450 in FIG. 4. Those peaks in the time series data can be considered as anomalies or unhealthy parts of the time series data. The overall health status of the service 122 may be determined by measuring an anomaly score from the time series data derived from the incident information set 212. The health index 222 may be determined based on the anomaly score or the anomaly scores if the time series data for different severity levels are obtained.

The anomaly detection algorithm may be based on a probabilistic model, a fitting model, a deep learning network, or the like. In some implementations, the incident classification policy may require using a k-sigma probabilistic model to calculate the respective health indices 222 for the services 122. An example k-sigma probabilistic model includes a 3-sigma probabilistic model. For each feature indicating the count of incidents at a respective severity level, an individual health score may be calculated based on the feature. According to the 3-sigma probabilistic model, the individual health score may be determined using a cumulative distribution function (CDF) and based on a distance between a count of incidents and the mean of samples for this feature, divided by the standard deviation.

In an example, the calculation may be represented as follows:

$$S_{sev} = \text{cdf}((\text{count}_{sev} - \text{mean})/\text{std}) \qquad \text{Equation (1)}$$

where $S_{sev}$ represents an individual health score based on a feature indicating the count of incidents at a respective severity level "sev", cdf( ) represents a CDF of a standard normal distribution which can be used to approximate the health score, $\text{count}_{sev}$ represents a count of incidents at the severity level, mean and std represents a mean and a standard deviation of the standard normal distribution.

In Equation (1), mean and std are a set of parameters in the 3-sigma probabilistic model that need to be determined in advance, which are used as a baseline for measuring the health score. In some implementations, as the distributions of the counts of indicates at a severity level may be different for different services 122, the two parameters mean and std may be determined specifically for each service 122. In some implementations, a historical incident information set associated with a service 122 may be obtained to determine the parameter set specific to this service 122. The historical incident information set may indicate one or more historical incidents reported during operation of the service 122 for a period of time. For example, the historical incident information set may be collected for the past three days, past ten days, past thirty days, or the like. The health monitoring system 220 may analyze the historical incident information set in a similar way as the incident information set 212 to determine the count of incidents at respective severity levels over time. For each severity level of a service 122, the mean and standard deviation of the counts of incidents for different time intervals may be calculated as the two parameters mean and std.

In some implementations, the health monitoring system 220 may combine the individual health scores calculated for the respective severity levels, to generate the health index 222 of the service 122.

In some implementations, to differentiate the impacts of the incidents at different severity levels, respective weights may be assigned for different severity levels. The weights may be directly applied to the incidents indicated in the incident information set 212. In an implementation, the weights may be applied to the individual health scores calculated for the respective severity levels when calculating the health index 222 from a combination of the individual health scores.

For example, the health index 222 for the service 122 may be determined based on the individual health scores and the weights for the severity levels, as follows:

$$H = \Sigma_{sev=0}^{max} w_{sev} \cdot S_{sev} \qquad \text{Equation (2)}$$

where H represents a combined score that is used to indicate a health index 222 for a service 122, $S_{sev}$ represents an individual health score for a respective severity level "sev" where "sev" is ranged from 0 to the maximum severity level (4 in the above example), and $w_{sev}$ represents a weight assigned for the severity level "sev." The weight may be set as any value from 0 to 1. In some implementations, if the health index is selected from a health index range including a plurality of qualitative indicators, the combined score H may be then accordingly mapped to one of the qualitative indicators.

In some implementations, in addition to the 3-sigma probabilistic model or as an alternative, the health classification policy may be configured using other the probabilistic model, the fitting model, and/or deep learning model can be adopted to calculate the heath indices 222 for the respective services 122. Some examples of other possible models may include a linear fitting/regression model, an AutoRegressive Integrated Moving Average (ARIMA) model, an Autoregressive Moving Average (ARMA) model, a forecasting model such as Prophet, an artificial Recurrent Neural Network (RNN) such as a Long Short-Term Memory Network (LSTM) model, and/or the like. In some implementations, the health classification policy may require using a hybrid model to determine the respective health indices for the services. The hybrid model may be assembled from a plurality of models. The plurality of models each generate a health score for a service 122, and the health index 222 for the service 122 may be determined by combining the output health scores from the plurality of models (for example, by calculating a weighted sum of the output health scores).

In some implementations, if the probabilistic model or the fitting model is used as required by the health classification policy, the parameter sets used for determining the health index 222 are derived from historical incident information sets associated with the respective services 122. Each parameter sets may be specific to one of the services 122. For example, if the 3-sigma probabilistic model is used, the parameters mean and std may be specifically determined for each service 122 based on a historical incident information set collected for this service 122. For a deep learning model such as a RNN or LSTM model, a common parameter set for the model may be determined from a collection of historical incident information (including a plurality of historical incident information sets) associated with the respective service 122. The common parameter set may be learned from the historical incident information through a training process to learn a mapping or association between an incident information set associated with a service 122 and a health index from a predetermined health index range.

In some implementations, the specific parameter sets or the common parameter set may be updated after a period of time with newly-collected historical incident information. For example, the parameters mean and std for a service 122 used in the 3-sigma probabilistic model may be updated with a new historical incident information set.

In the implementations described above, respective health indices 222 for the services 122 in the computing environment 100 are determined. The health indices 222 are determined per service. In some implementations, as the health indices 222 are determined in a unified manner, a health threshold may be set to determine whether a service 122 is healthy or not based on the corresponding health index 222. For example, it is assumed that a higher health index 122 indicates that a service 122 is healthier. If a health index 122 of a certain service 122 is lower than a preset health threshold, it indicates that this service 122 is unhealthy; otherwise, this service 122 is healthy.

In some implementations, as one or more of the services 122 may be accessed from different regions or depend on resources localized at different regions, for each service 122, the health monitoring system 210 may determine respective health indices 222 for different regions. Those per-region health indices 222 can be used to indicate the health statuses of the service 122 within respective regions. In some implementations, the incident information set 212 associated with a service 122 may indicate respective regions where incidents are reported for this service 122. The health monitoring system 210 may determine a health index 222 for a region based on the incidents from reported from this region. That is, the incident information set 212 may be divided on the region basis, as a plurality of incident information subsets for the regions. For each incident information subset, the same or similar approach as described above may be applied to determine a health index for the service 122 in the corresponding region.

According to different implementations of the subject matter described herein, the health monitoring system 210 may be capable of determining multi-service health indices 222 and multi-region health indices 222. The universal health indices 222 for a plurality of services and probably for a plurality of regions can be used to facilitate issue detection, diagnosis, refine trouble influence analysis, and boost other machine learning models for intelligent outage management. In some implementations, the health indices 222 may be presented in a user interface to a user, such as a service administrator 140 of the computing environment 100. The health indices 222 may be presented together with indications of the respective services 122. If the health indices 222 are determined on a region basis, the health indices 222 may be arranged in the user interface to indicate the associated services 122 and the regions. Appropriate visualization may be applied in the user interface to indicate the health indices.

Figure 5:
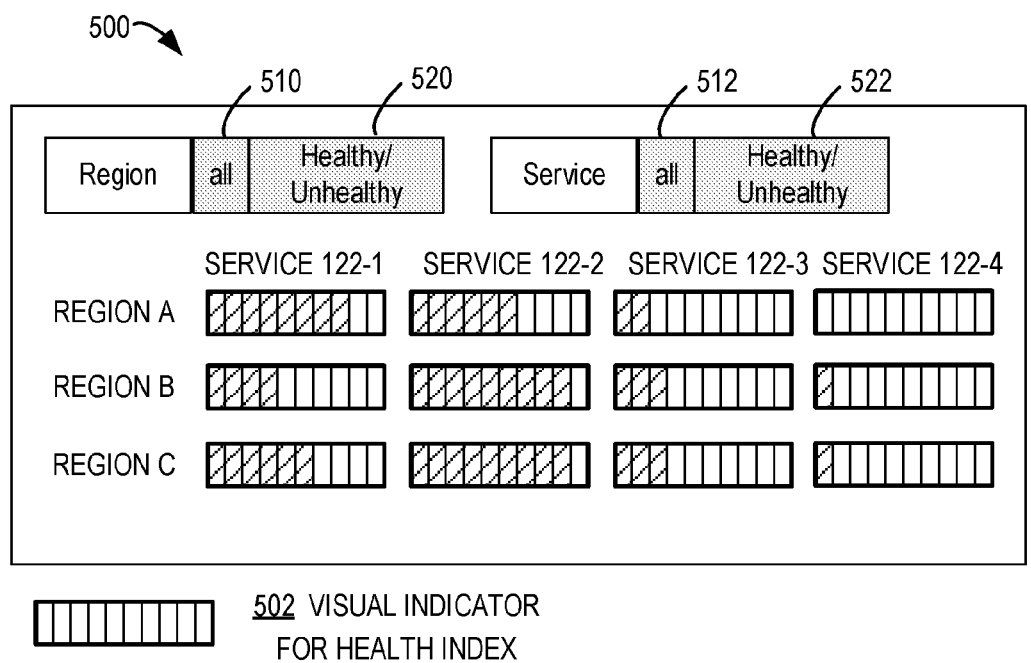
FIG. 5 illustrates an example user interface showing health indices in accordance with an implementation of the subject matter described herein.

FIG. 5 illustrates an example user interface 500 where visual indicators 502 for health indices of services 122-1 to 122-4 are presented. The visual indicators 502 may be designed to represent different health indices. For each service, a plurality of health indices for Region A, Region B, and Region C are also presented. The multi-service and multi-region presentation of the health indices can help the user to monitor and compare the health statuses of the services 122 in different regions in a convenient way. In this specific example, the user interface 500 also allows the user to select the health indices to be presented. For example, through selectable options 510 and 512, the user can filter the concerned regions and services. Through selectable options 520 and 522, the user can determine whether to present health indices of unhealthy services only, select present indices of healthy services only, or present both.

Figure 6A:
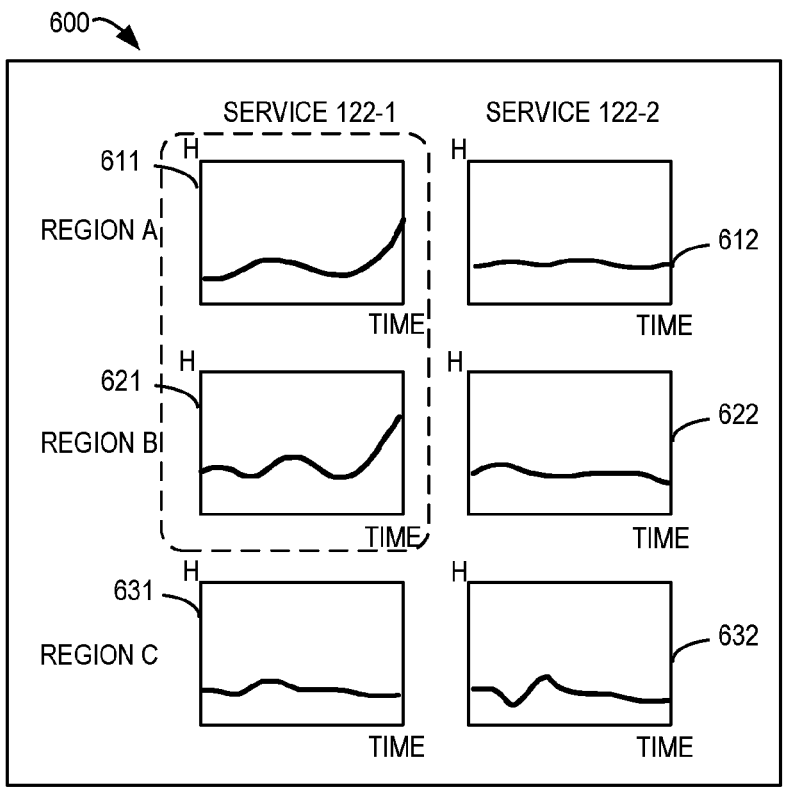
FIGS. 6A and 6B illustrate further example user interfaces showing health indices in accordance with some implementations of the subject matter described herein.
Figure 6B:
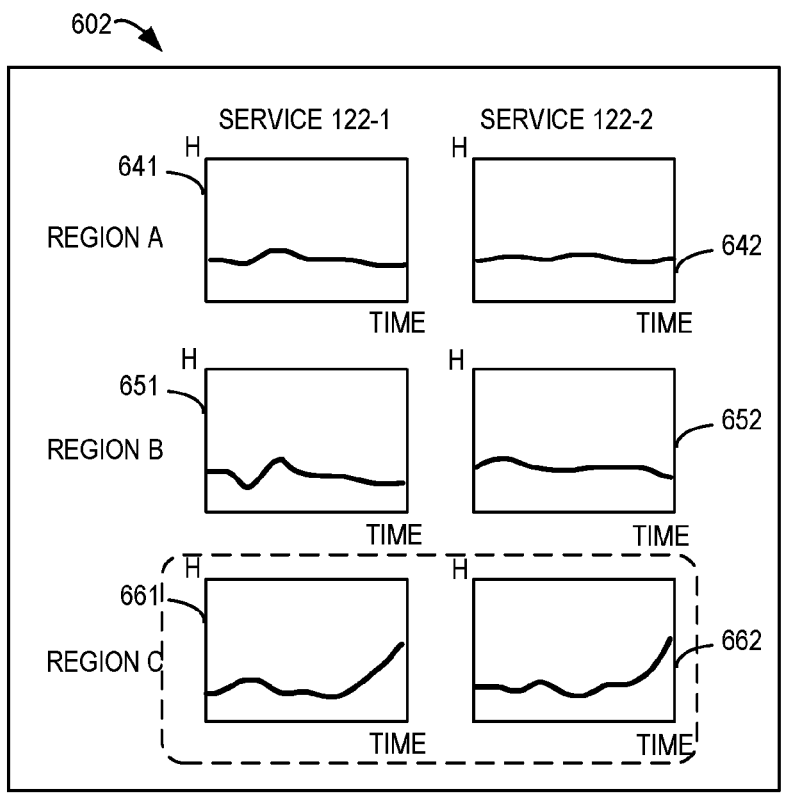

In some implementations, change trends of the health indices 222 for the respective services 122 over time may further facilitate the diagnosis of the services or prediction of outage. Therefore, for a certain service 122, a plurality of health indices 222 may be determined from a plurality of incident information sets reported over a plurality of periods of time. In an implementation, respective health indices 222 for a plurality of regions may be determined for this service 122. The health indices 222 for each service may be presented to indicate its change over time. FIGS. 6A and 6B illustrate further example user interfaces 600 and 601 showing health indices in accordance with some implementations of the subject matter described herein.

In the user interface 600 of FIG. 6A, a graph 611 presents health indices (represented as "H") determined over time for the service 122-1 in Region A, a graph 612 presents health indices determined over time for the service 122-2 in Region B. Similarly, graphs 621, 622, 631, and 632 indicate health indices over time for the services 122-1, 122-2 in Region B, Region C. By monitoring the change of the health indices of the services, a user may observe, from the graphs 611 and 621, a rapid growth of the health index for the service 122-1 in both Region A and Region B. The user may determine that there may be a cross-region outage for the service 122-1 (assuming that a higher health index indicates an unhealthier service in the examples of FIGS. 6A and 6B).

In the user interface 602 of FIG. 6A, graphs 641, 642, 651, 652, 661, and 662 indicate health indices over time for the services 122-1, 122-2 in Region A, Region B, Region C. By monitoring the change of the health indices of the services, a user may observe, from the graphs 661 and 662, a rapid growth of the health index for the services 122-1, 122-2 in Region C. The user may determine that there may be a cross-service outage in this region.

It would be appreciated that the example presentations in FIG. 5, FIG. 6A, and FIG. 6B are provided for the purpose of illustration only. The health indices may be presented in any other manners. More detailed information may be presented together with the health indices to allow the viewer obtaining information.

Figure 7:
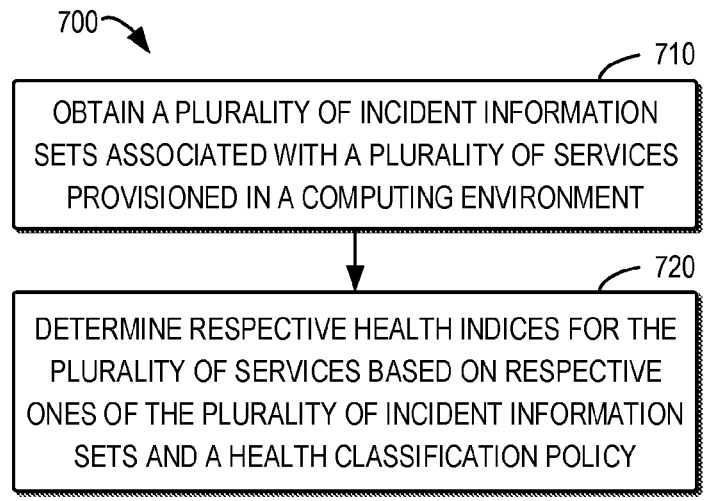
FIG. 7 illustrates a flowchart of a process in accordance with an implementation of the subject matter described herein.

FIG. 7 illustrates a flowchart of a process 700 in accordance with some implementations of the subject matter described herein. The process 700 can be implemented by the health monitoring system 220.

At block 710, the health monitoring system 220 obtains a plurality of incident information sets associated with a plurality of services provisioned in a computing environment. An incident information set associated with a service indicates at least one incident reported during operation of the service. At block 720, the health monitoring system 220 determines respective health indices for the plurality of services based on respective ones of the plurality of incident information sets and a health classification policy. The respective health indices indicate respective health statuses of the plurality of services and being determined from a same health index range.

In some implementations, the incident information set associated with a given service of the plurality of services indicates a plurality of regions where incidents are reported during operation of the given service. In some implementations, determining the respective indices comprises: determining a plurality of health indices for the given service based on the associated incident information set, the plurality of health indices indicating respective health statuses of the given service in the plurality of regions.

In some implementations, the incident information set further indicates at least one severity level of the at least one incident, the at least one severity level being selected from a plurality of severity levels. In some implementations, determining the respective health indices comprises: determining the respective health indices for the plurality of services by applying at least one weight for the at least one incident at the at least one severity level, the at least one weight being selected from a plurality of weights assigned for the plurality of severity levels.

In some implementations, the incident information indicates the at least one incident in an active status.

In some implementations, the health classification policy comprises a plurality of respective parameter sets for the plurality of services. In some implementations, the process further comprises for a given service of the plurality of services, obtaining a historical incident information set associated with the given service, the historical incident information set indicating at least one historical incident reported during operation of the given service; and determining, based on the historical incident information set, a given parameter set of the plurality of parameter sets for the given service.

In some implementations, the health classification policy comprises a common parameter set. In some implementations, the process further comprises obtaining a plurality of historical incident information sets associated with the plurality of services, a historical incident information set associated with a service indicating at least one historical incident reported during operation of the service; and determining the common parameter set based on the plurality of historical incident information sets.

In some implementations, the process further comprises presenting, in a user interface, the respective health indices in combination with respective indications of the plurality of services.

Figure 8:
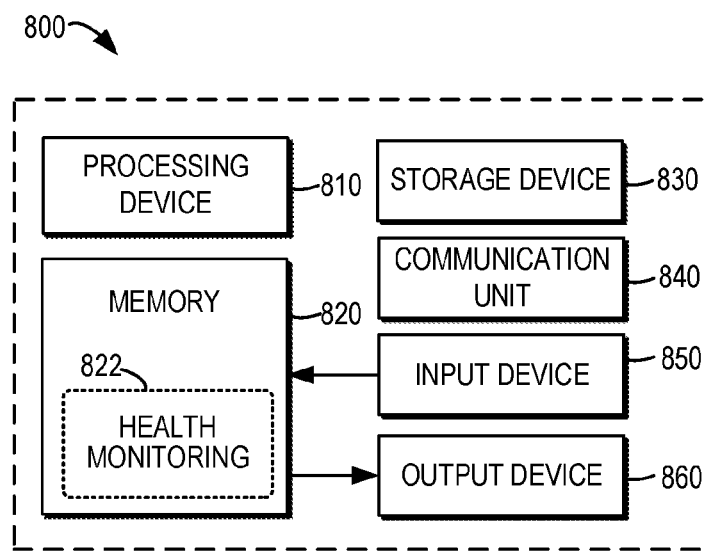
FIG. 8 illustrates a block diagram of a computer environment in which various implementations of the subject matter described herein can be implemented.

FIG. 8 illustrates a block diagram of a computing device 800 in which various implementations of the subject matter described herein can be implemented. It would be appreciated that the computing device 800 as shown in FIG. 8 is merely provided as an example, without suggesting any limitation to the functionalities and scope of implementations of the subject matter described herein. The health monitoring system 220 may be fully or partially implemented in the computing device 800.

As shown in FIG. 8, the computing device 800 includes a computing device 800 in the form of a general-purpose computing device. Components of the computing device 800 can include, but are not limited to, one or more processors or processing units 810, a memory 820, a storage device 830, one or more communication units 840, one or more input devices 850, and one or more output devices 860.

In some implementations, the computing device 800 may be implemented as various user terminal or server terminal. The server terminal may be any server, large-scale computing device, and any other devices provided by various service providers. The user terminal may, for example, be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, radio broadcast receiver, E-book device, gaming device, or any combination thereof, including the accessories and peripherals of these devices, or any combination thereof. It is also contemplated that the computing device 800 can support any type of interface to a user (such as "wearable" circuitry and the like).

The processing unit 810 can be a physical or virtual processor and can implement various processes based on programs stored in the memory 820. In a multi-processor system, multiple processing units execute computer-executable instructions in parallel so as to improve the parallel processing capability of the computing device 800. The processing unit 810 may also be referred to as a central processing unit (CPU), a microprocessor, a controller, or a microcontroller.

The computing device 800 usually includes various computer storage medium. The computer storage medium may be any available medium accessible by the computing device 800, including but not limited to, volatile and non-volatile medium, or detachable and non-detachable medium. The memory 820 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The storage device 830 may be any detachable or non-detachable medium and may include machine-readable medium such as a memory, a flash drive, a magnetic disk, or any other medium, which can be used for storing information and/or data and are accessible by the computing device 800.

The computing device 800 may further include additional detachable/non-detachable, volatile/non-volatile memory medium. Although not shown in FIG. 8, it is possible to provide a disk drive for reading from or writing into a detachable and non-volatile disk, and an optical disk drive for reading from and writing into a detachable non-volatile optical disc. In such case, each drive may be connected to a bus (not shown) via one or more data medium interfaces.

The communication unit 840 communicates with a further computing device via the communication medium. In addition, the functions of components in the computing device 800 may be implemented by a single computing cluster or multiple computing machines that can communicate with each other via communication connections. Therefore, the computing device 800 can operate in a networked environment using logic connections with one or more other servers, network personal computers (PCs), or further general network nodes.

The input device 850 may include one or more of various input devices, such as a mouse, keyboard, tracking ball, voice-input device, and the like. The output device 860 may include one or more of various output devices, such as a display, loudspeaker, printer, and the like. By means of the communication unit 840, the computing device 800 can further communicate with one or more external devices (not shown) such as storage devices and display devices, one or more devices that enable the user to interact with the computing device 800, or any devices (such as a network card, a modem and the like) that enable the computing device 800 to communicate with one or more other computing devices, if required. Such communication may be performed via input/output (I/O) interfaces (not shown).

The computing device 800 can be used to implement health monitoring according to various implementations of the subject matter described herein, to provide health indices for services. The memory 820 may include one or more modules having one or more program instructions. These modules can be accessed and executed by the processing unit 810 to perform the functionalities of various implementations described herein. For example, the memory 820 may include a health monitoring module 822 to implement the health monitoring described above.

Some example implementations of the subject matter described herein are listed below.

In a first aspect, the subject matter described herein provides a computer-implemented method. The method comprises: obtaining a plurality of incident information sets associated with a plurality of services provisioned in a computing environment, an incident information set associated with a service indicating at least one incident reported during operation of the service; and determining respective health indices for the plurality of services based on respective ones of the plurality of incident information sets and a health classification policy, the respective health indices indicating respective health statuses of the plurality of services and being determined from a same health index range.

In some implementations, the incident information set associated with a given service of the plurality of services indicates a plurality of regions where incidents are reported during operation of the given service. In some implementations, determining the respective indices comprises: determining a plurality of health indices for the given service based on the associated incident information set, the plurality of health indices indicating respective health statuses of the given service in the plurality of regions.

In some implementations, the incident information set further indicates at least one severity level of the at least one incident, the at least one severity level being selected from a plurality of severity levels. In some implementations, determining the respective health indices comprises: determining the respective health indices for the plurality of services by applying at least one weight for the at least one incident at the at least one severity level, the at least one weight being selected from a plurality of weights assigned for the plurality of severity levels.

In some implementations, the incident information indicates the at least one incident in an active status.

In some implementations, the health classification policy comprises a plurality of respective parameter sets for the plurality of services. In some implementations, the method further comprises for a given service of the plurality of services, obtaining a historical incident information set associated with the given service, the historical incident information set indicating at least one historical incident reported during operation of the given service; and determining, based on the historical incident information set, a given parameter set of the plurality of parameter sets for the given service.

In some implementations, the health classification policy comprises a common parameter set. In some implementations, the method further comprises obtaining a plurality of historical incident information sets associated with the plurality of services, a historical incident information set associated with a service indicating at least one historical incident reported during operation of the service; and determining the common parameter set based on the plurality of historical incident information sets.

In some implementations, the method further comprises presenting, in a user interface, the respective health indices in combination with respective indications of the plurality of services.

In a second aspect, the subject matter described herein provides an electronic device. The device comprises a processing unit; and a memory coupled to the processing unit and having instructions stored thereon, the instructions, when executed by the processing unit, causing the device to perform acts comprising: obtaining a plurality of incident information sets associated with a plurality of services provisioned in a computing environment, an incident information set associated with a service indicating at least one incident reported during operation of the service; and determining respective health indices for the plurality of services based on respective ones of the plurality of incident information sets and a health classification policy, the respective health indices indicating respective health statuses of the plurality of services and being determined from a same health index range.

In some implementations, the incident information set associated with a given service of the plurality of services indicates a plurality of regions where incidents are reported during operation of the given service. In some implementations, determining the respective indices comprises: determining a plurality of health indices for the given service based on the associated incident information set, the plurality of health indices indicating respective health statuses of the given service in the plurality of regions.

In some implementations, the incident information set further indicates at least one severity level of the at least one incident, the at least one severity level being selected from a plurality of severity levels. In some implementations, determining the respective health indices comprises: determining the respective health indices for the plurality of services by applying at least one weight for the at least one incident at the at least one severity level, the at least one weight being selected from a plurality of weights assigned for the plurality of severity levels.

In some implementations, the incident information indicates the at least one incident in an active status.

In some implementations, the health classification policy comprises a plurality of respective parameter sets for the plurality of services. In some implementations, the acts further comprise for a given service of the plurality of services, obtaining a historical incident information set associated with the given service, the historical incident information set indicating at least one historical incident reported during operation of the given service; and determining, based on the historical incident information set, a given parameter set of the plurality of parameter sets for the given service.

In some implementations, the health classification policy comprises a common parameter set. In some implementations, the acts further comprise obtaining a plurality of historical incident information sets associated with the plurality of services, a historical incident information set associated with a service indicating at least one historical incident reported during operation of the service; and determining the common parameter set based on the plurality of historical incident information sets.

In some implementations, the acts further comprise presenting, in a user interface, the respective health indices in combination with respective indications of the plurality of services.

In a third aspect, the subject matter described herein provides a computer program product being tangibly stored on a non-transient computer storage medium and comprising machine-executable instructions which, when executed by a device, cause the device to perform acts comprising obtaining a plurality of incident information sets associated with a plurality of services provisioned in a computing environment, an incident information set associated with a service indicating at least one incident reported during operation of the service; and determining respective health indices for the plurality of services based on respective ones of the plurality of incident information sets and a health classification policy, the respective health indices indicating respective health statuses of the plurality of services and being determined from a same health index range.

In some implementations, the incident information set associated with a given service of the plurality of services indicates a plurality of regions of incidents reported during operation of the given service. In some implementations, determining the respective indices comprises: determining a plurality of health indices for the given service based on the associated incident information set, the plurality of health indices indicating respective health statuses of the given service in the plurality of regions.

In some implementations, the incident information set further indicates at least one severity level of the at least one incident, the at least one severity level being selected from a plurality of severity levels. In some implementations, determining the respective health indices comprises: determining the respective health indices for the plurality of services by applying at least one weight for the at least one incident at the at least one severity level, the at least one weight being selected from a plurality of weights assigned for the plurality of severity levels.

In some implementations, the incident information indicates the at least one incident in an active status.

In some implementations, the health classification policy comprises a plurality of respective parameter sets for the plurality of services. In some implementations, the acts further comprise for a given service of the plurality of services, obtaining a historical incident information set associated with the given service, the historical incident information set indicating at least one historical incident reported during operation of the given service; and determining, based on the historical incident information set, a given parameter set of the plurality of parameter sets for the given service.

In some implementations, the health classification policy comprises a common parameter set. In some implementations, the acts further comprise obtaining a plurality of historical incident information sets associated with the plurality of services, a historical incident information set indicating at least one historical incident reported during operation of a service; and determining the common parameter set based on the plurality of historical incident information sets.

In some implementations, the acts further comprise presenting, in a user interface, the respective health indices in combination with respective indications of the plurality of services.

In still a further aspect, the subject matter described herein provides a computer readable medium having machine-executable instructions stored thereon which, when executed by a device, cause a device to perform one or more implementations of the above method.

The functionalities described herein can be performed, at least in part, by one or more hardware logic components. For example, and without limitation, illustrative types of hardware logic components that can be used include field-programmable gate arrays (FPGAs), Application-specific Integrated Circuits (ASICs), application-specific standard products (ASSPs), system-on-a-chip systems (SOCs), complex programmable logic devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A computer-implemented method comprising:
   obtaining a plurality of incident information sets associated with a plurality of services provisioned in a computing environment, an incident information set associated with a service indicating a plurality of incidents reported during operation of the service;
   calculating a health index for a service associated with each incident information set of the plurality of incident information sets by:
      extracting features from the incident information sets, wherein the features include a severity level of each incident of the plurality of incidents;
      inputting the features into a machine learning algorithm to output a health score for each severity level of a plurality of severity levels associated with the plurality of incidents; and
      evaluating respective health scores for each severity level using a health classification policy to generate a health index for the service, wherein the health index is calculated as a sum of weighted health scores for each severity level, wherein a weight for a particular health score is chosen from a plurality of weights corresponding to the plurality of severity levels;
   generating health indices for each service of the plurality of services, wherein the health indices indicate respective health statuses of the plurality of services and are determined from a same health index range;
   receiving inputs from a user interface control defining a filter policy for the health indices; and
   outputting a set of visual representations corresponding to the health indices based on the filter policy.

2. The computer-implemented method of claim 1, wherein the incident information set associated with a given service of the plurality of services indicates a plurality of regions where incidents are reported during operation of the given service, and wherein determining the health indices comprises:
   determining a plurality of health indices for the given service based on the incident information set, the plurality of health indices indicating respective health statuses of the given service in the plurality of regions.

3. The computer-implemented method of claim 1, wherein the incident information set further indicates at least one severity level of, for an incident, selected from the plurality of severity levels, and wherein determining the health indices comprises:
   determining the health indices for the plurality of services by applying at least one weight for the incident at the at least one severity level, the at least one weight being selected from a plurality of weights assigned for the plurality of severity levels.

4. The computer-implemented method of claim 1, wherein the incident information set indicates at least one incident in an active status.

5. The computer-implemented method of claim 1, wherein the health classification policy comprises a plurality of respective parameter sets for the plurality of services, the computer-implemented method further comprising:
   for a given service of the plurality of services,
   obtaining a historical incident information set associated with the given service, the historical incident information set indicating at least one historical incident reported during operation of the given service; and
   determining, based on the historical incident information set, a given parameter set of the plurality of respective parameter sets for the given service.

6. The computer-implemented method of claim 1, wherein the health classification policy comprises a common parameter set, the computer-implemented method further comprising:
   obtaining a plurality of historical incident information sets associated with the plurality of services, a historical incident information set indicating associated with a service at least one historical incident reported during operation of the service; and
   determining the common parameter set based on the plurality of historical incident information sets.

7. The computer-implemented method of claim 1, further comprising:
   presenting, in a user interface, the health indices in combination with respective indications of the plurality of services.

8. An electronic device, comprising:
   a processing unit; and
   a memory coupled to the processing unit and having instructions stored thereon, the instructions, when executed by the processing unit, causing the electronic device to perform acts comprising:

obtaining a plurality of incident information sets associated with a plurality of services provisioned in a computing environment, an incident information set associated with a service indicating a plurality of incidents reported during operation of the service;

calculating a health index for a service associated with each incident information set of the plurality of incident information sets by:

extracting features from the incident information sets, wherein the features include a severity level of each incident of the plurality of incidents;

inputting the features into a machine learning algorithm to output a health score for each severity level of a plurality of severity levels associated with the plurality of incidents; and evaluating respective health scores for each severity level using a health classification policy to generate a health index for the service, wherein the health index is calculated as a sum of weighted health scores for each severity level, wherein a weight for a particular health score is chosen from a plurality of weights corresponding to the plurality of severity levels;

generating health indices for each service of the plurality of services, wherein the health indices indicate respective health statuses of the plurality of services and are determined from a same health index range;

receiving inputs from a user interface control defining a filter policy for the health indices; and outputting a set of visual representations corresponding to the health indices based on the filter policy.

9. The electronic device of claim 8, wherein the incident information set associated with a given service of the plurality of services indicates a plurality of regions where incidents are reported during operation of the given service, and wherein determining the health indices comprises:

determining a plurality of health indices for the given service based on the incident information set, the plurality of health indices indicating respective health statuses of the given service in the plurality of regions.

10. The electronic device of claim 8, wherein the incident information set further indicates at least one severity level, for an incident, selected from the plurality of severity levels, and wherein determining the health indices comprises:

determining the health indices for the plurality of services by applying at least one weight for the incident at the at least one severity level, the at least one weight being selected from a plurality of weights assigned for the plurality of severity levels.

11. The electronic device of claim 8, wherein the incident information set indicates at least one incident in an active status.

12. The electronic device of claim 8, wherein the health classification policy comprises a plurality of respective parameter sets for the plurality of services, the acts further comprising:

for a given service of the plurality of services, obtaining a historical incident information set associated with the given service, the historical incident information set indicating at least one historical incident reported during operation of the given service; and determining, based on the historical incident information set, a given parameter set of the plurality of respective parameter sets for the given service.

13. The electronic device of claim 8, wherein the health classification policy comprises a common parameter set, the acts further comprising:

obtaining a plurality of historical incident information sets associated with the plurality of services, a historical incident information set associated with a service indicating at least one historical incident reported during operation of the service; and determining the common parameter set based on the plurality of historical incident information sets.

14. The electronic device of claim 8, wherein the acts further comprise:

presenting, in a user interface, the health indices in combination with respective indications of the plurality of services.

15. At least one non-transitory machine-readable computer storage medium comprising instructions that, when executed by at least one processor, cause the at least one processor to perform operations to:

obtain a plurality of incident information sets associated with a plurality of services provisioned in a computing environment, an incident information set associated with a service indicating a plurality of incidents reported during operation of the service;

calculate a health index for a service associated with each incident information set of the plurality of incident information sets by:

extract features from the incident information sets, wherein the features include a severity level of each incident of the plurality of incidents;

input the features into a machine learning algorithm to output a health score for each severity level of a plurality of severity levels associated with the plurality of incidents; and evaluate respective health scores for each severity level using a health classification policy to generate a health index for the service, wherein the health index is calculated as a sum of weighted health scores for each severity level, wherein a weight for a particular health score is chosen from a plurality of weights corresponding to the plurality of severity levels;

generate health indices for each service of the plurality of services, wherein the health indices indicate respective health statuses of the plurality of services and are determined from a same health index range;

receive inputs from a user interface control defining a filter policy for the health indices; and output a set of visual representations corresponding to the health indices based on the filter policy.

16. The at least one non-transitory machine-readable computer storage medium of claim 15, wherein the incident information set associated with a given service of the plurality of services indicates a plurality of regions where incidents are reported during operation of the given service, and wherein the instructions to determine the health indices comprises instructions to:

determine a plurality of health indices for the given service based on the incident information set, the plurality of health indices indicating respective health statuses of the given service in the plurality of regions.

17. The at least one non-transitory machine-readable computer storage medium of claim 15, wherein the incident information set further indicates at least one severity level, for an incident, selected from the plurality of severity levels, and wherein the instructions to determine the health indices comprises instructions to:

determine the health indices for the plurality of services by applying at least one weight for the incident at the at least one severity level, the at least one weight being selected from a plurality of weights assigned for the plurality of severity levels.

18. The at least one non-transitory machine-readable computer storage medium of claim 15, wherein the incident information set indicates at least one incident in an active status.

19. The at least one non-transitory machine-readable computer storage medium of claim 15, wherein the health classification policy comprises a plurality of respective parameter sets for the plurality of services and further comprising instructions that cause the at least one processor to perform operations to:

for a given service of the plurality of services,
obtain a historical incident information set associated with the given service, the historical incident information set indicating at least one historical incident reported during operation of the given service; and
determine, based on the historical incident information set, a given parameter set of the plurality of respective parameter sets for the given service.

20. The at least one non-transitory machine-readable computer storage medium of claim 15, wherein the health classification policy comprises a common parameter set and further comprising instructions that cause the at least one processor to perform operations to:

obtain a plurality of historical incident information sets associated with the plurality of services, a historical incident information set associated with a service indicating at least one historical incident reported during operation of the service; and
determine the common parameter set based on the plurality of historical incident information sets.

* * * * *